United States Patent [19]

Eberhardt

[11] Patent Number: 5,085,770
[45] Date of Patent: Feb. 4, 1992

[54] OIL SEPARATOR

[76] Inventor: H. Alfred Eberhardt, Hale Fire Pump Co., 700 Spring Mill Ave., Conshohocken, Pa. 19428

[21] Appl. No.: 592,350

[22] Filed: Oct. 3, 1990

[51] Int. Cl.⁵ .......................................... E02B 15/04
[52] U.S. Cl. ................................ 210/242.3; 210/923
[58] Field of Search ................ 210/242.3, 242.4, 923, 210/924, 776

[56] References Cited

U.S. PATENT DOCUMENTS

| | | | |
|---|---|---|---|
| 3,536,199 | 10/1070 | Cornelius | 210/923 |
| 3,968,041 | 7/1976 | Di Voss | 210/242.3 |
| 4,360,429 | 11/1982 | Morris | 210/923 |
| 4,514,299 | 4/1985 | Ayroldi | 210/923 |
| 4,555,338 | 11/1985 | Marchionda | 210/242.4 |
| 4,575,426 | 3/1986 | Littlejohn et al. | 210/924 |
| 4,769,142 | 9/1988 | Withnall | 210/924 |
| 4,851,133 | 7/1989 | Rymal | 210/242.3 |

*Primary Examiner*—Stanley S. Silverman
*Assistant Examiner*—Christopher Upton
*Attorney, Agent, or Firm*—Frank A. Follmer

[57] ABSTRACT

An oil skimmer and separator for use in cleaning up oil spills utilizes a light weight water driven turbine for driving a mechanical oil separating means. The device is adapted to be powered by existing firefighting equipment such as fire pumps on ships and on fire trucks.

12 Claims, 4 Drawing Sheets

OIL SEPARATOR

BACKGROUND AND SUMMARY OF THE INVENTION

This invention relates generally to oil separators and, more specifically, to an oil skimmer and separator for use in cleaning up oil spills.

In the case of an oil spill, it is important that the clean-up operation begin as soon as possible so as to limit the spreading of the oil away from the site of the spill. Accordingly, it would be desirable to have a clean-up device that can be handled and deployed quickly and easily and that can be conveniently stored on an oil transport ship or at a site where an oil spill could occur. Furthermore, it would be desirable to power such a device with existing emergency fire fighting equipment, such as fire pumps on ships and on fire trucks. It would also be desirable that the clean-up device can be carried on small boats or helicopters.

To this end, the oil skimmer and separator in accordance with the invention is constructed to be light in weight and of a size and configuration such that it can be stored on a ship or on a dock conveniently, and can be carried by small boats or helicopters. Furthermore, the device in accordance with the invention is designed so that it can be deployed onto a body of water where the oil spill has occurred so as to float near the surface of this body of water in a manner to skim the oil/water mixture from the oil spill for separation purposes. Thus, the oil skimmer and separator in accordance with the invention utilizes a light weight water-driven turbine for driving the oil separating mechanisms, which may include an oil discharge pump. Water-driven turbines can be made light in weight and still provide the horsepower necessary to drive the oil separating mechanisms. Also, because they are light in weight, the water-driven turbines can be floated easily.

Generally speaking, oil transport ships are heavily equipped with fire fighting pumps and hoses, thereby providing a readily available source of high pressure water power. It is this source of water power that can be used by the device of the invention to drive the light weight water turbines employed therein. It is also to be noted that should the oil spill occur near a shore, fire trucks could be used in such an emergency to supply the high pressure water and hoses to drive these water turbines.

RELATED APPLICATIONS

This application relates to my copending application, Ser. No. 558,693, filed July 26, 1990, and is a mechanical version of the oil skimmer and separator shown therein. The device of the present application is more suited for use in oil spills where the oil is heavier and has a high tar content.

DETAILED DESCRIPTION OF THE PREFERRED EMBODIMENT

Figure 1:
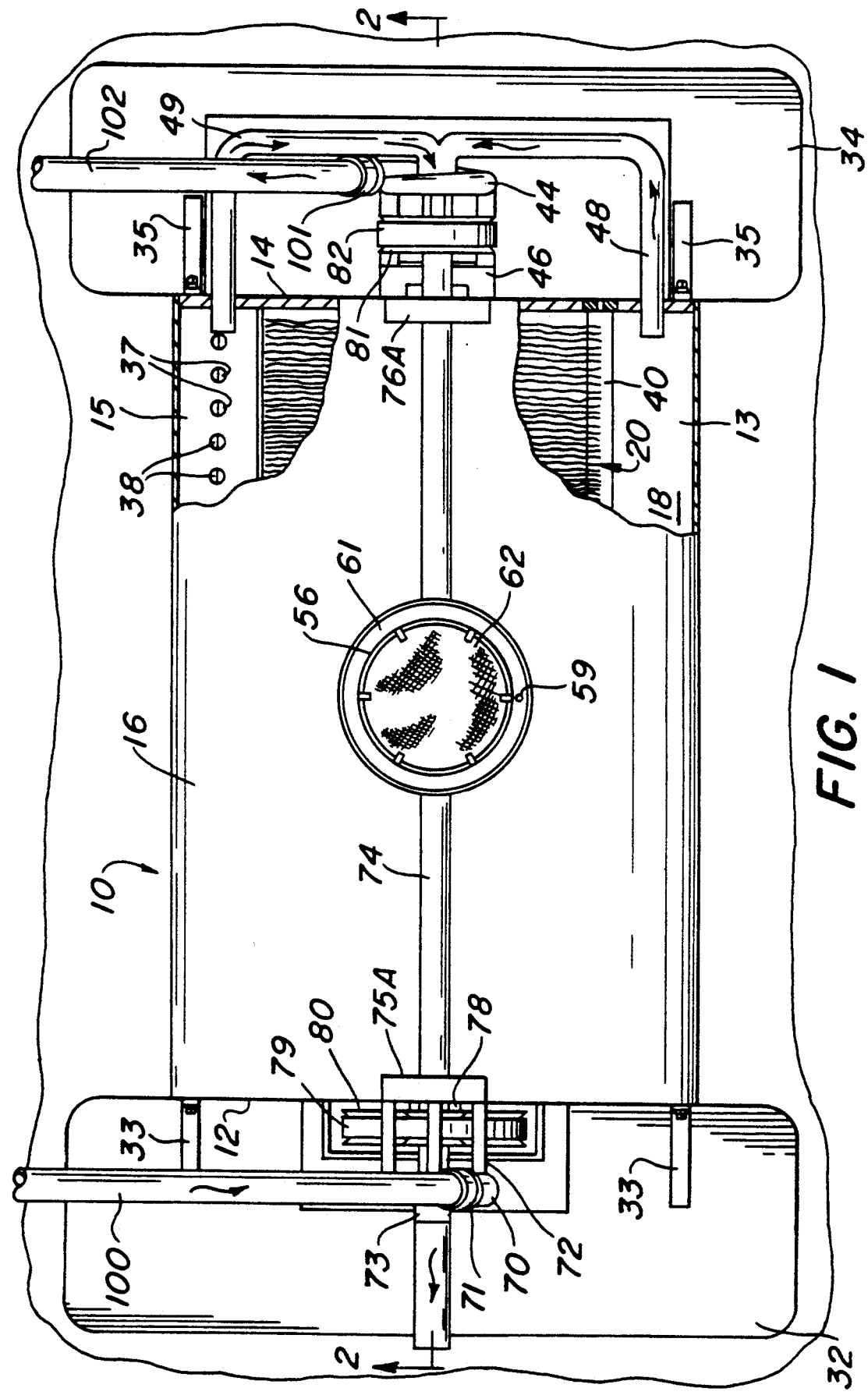
FIG. 1 is a plan view showing the oil skimmer and separator in accordance with the invention.

The oil skimmer and separator of the invention comprises a housing 10 made of a lightweight material, such as aluminum or plastic, and including a left side 12, a right side 14 and a top wall or roof 16. Sides 12 and 14 are flat plates having a generally semicircular configuration and extending vertically. Top wall 16 is curved to conform to the semicircular configuration of side walls 12 and 14. Housing 10 includes a pair of trough-shaped portions 13 and 15 at the bottom thereof providing "catch" pans for the separated oil as will be described hereafter. As shown in the Drawings, the parts of housing 10 are constructed and arranged to provide an internal chamber 18 having a rectangular bottom opening 19 extending between the inner ends of portions 13 and 15 and side walls 12 and 14. In use, bottom opening 19 will overlie the body of water containing an oil spill as will be described more fully hereafter.

Figure 2:
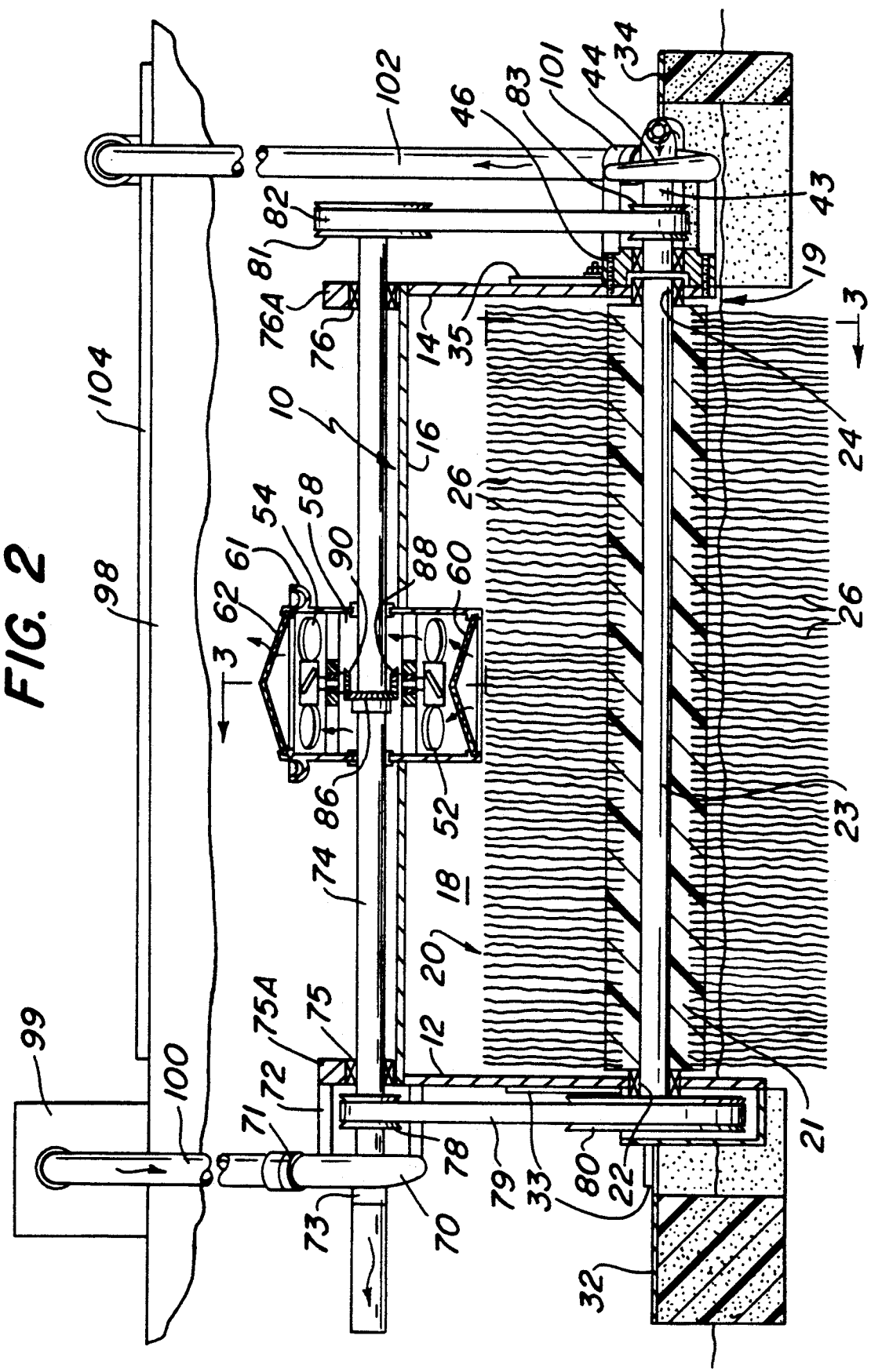
FIG. 2 is a sectional view taken on line 2—2 of FIG. 1.

A brush, indicated generally at 20, is rotatably mounted in housing 10 to extend through said bottom opening 19 therein. Brush 20 includes a cylindrical hub 21 fixedly mounted on a shaft 23 extending between sides 12 and 14 and rotatably mounted in bearings 22 and 24 mounted in sides 12 and 14, respectively, as best shown in FIG. 2. Brush 20 comprises a plurality of bristles 26 engaged with hub 21 at their inner ends and extending therefrom to form a cylindrical outer surface of brush 20. Bristles 26 may be constructed in various suitable ways known in the art so that they pick up a maximum amount of oil by reason of the tendency of the oil to adhere to the surface of the bristles 26. To this end, the bristles 26 are preferably made of long nylon bristles, which may or may not be barbed for adhering to the oil as they pass through a quantity of liquid containing an oil spill.

There is provided a float means constructed and arranged to support housing 10 and other parts of the oil separator near the surface of a body of water containing an oil spill in a manner so that brush 20 is positioned to move through a circular path including a first portion wherein brush 20 dips into and moves through the oil/water mixture near the surface of said body of water to pick up oil adhering to the bristle surfaces and a second portion located above the surface of said body of water. To this end, there is provided a first float 32 secured to the left side 12 of housing 10 and a second float 34 secured to the right side 14 of housing 10 by means of pairs of brackets 33 and 35, respectively. Housing 10 is mounted on floats 32 and 34 so as to be adjustable vertically relative thereto so that, in use, the position of the housing 10 relative to the surface of the water can be adjusted. To this end, the sides 12 and 14 are secured to the mounting brackets 33 and 34 by means of bolts which extend through vertical slots in brackets 33 and 34 and threadedly engage sides 12 and 14 so a to permit the vertical adjustment of housing 10 relative to the surface of the water. In this manner, the oil skimmer and separator can be adjusted to take into the account the wave action of the body of water and the density of the oil/water mixture being skimmed from the body of water.

Figure 3:
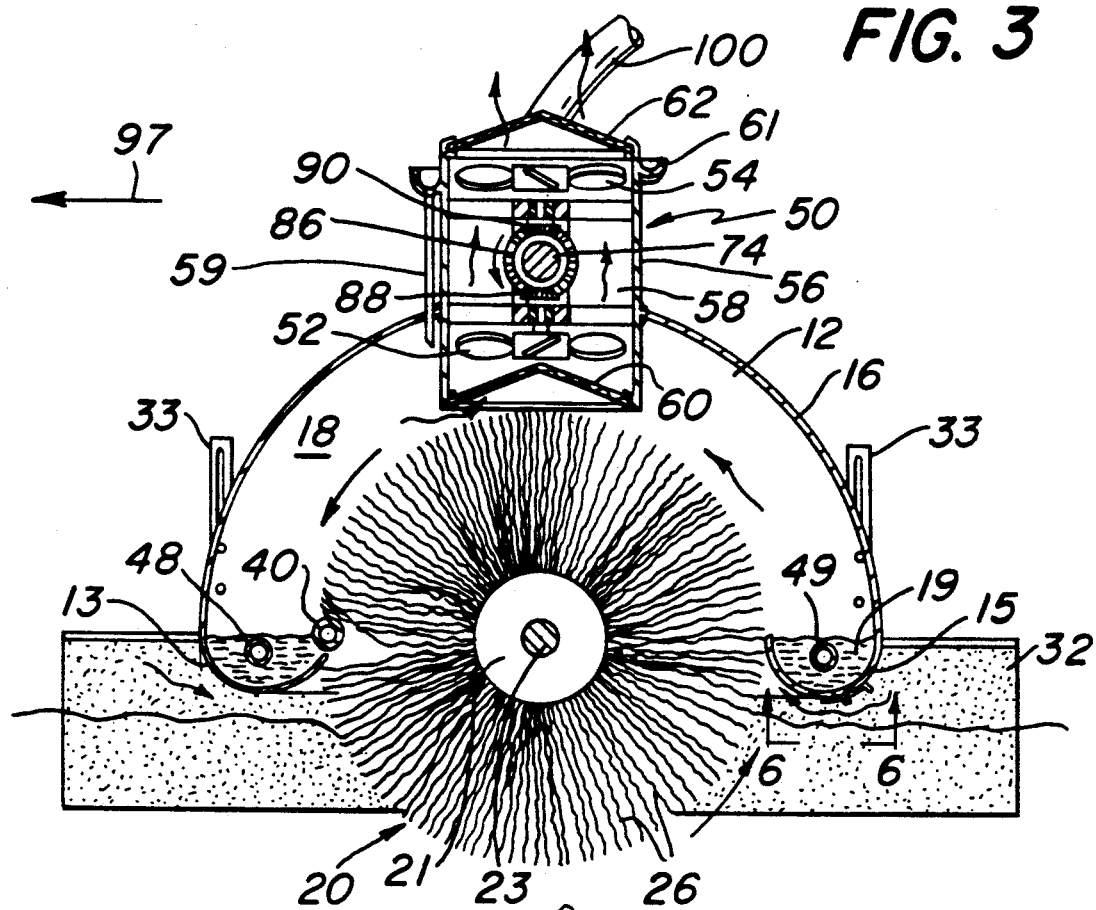
FIG. 3 is a sectional view taken on line 3—3 of FIG. 2.
Figure 4:
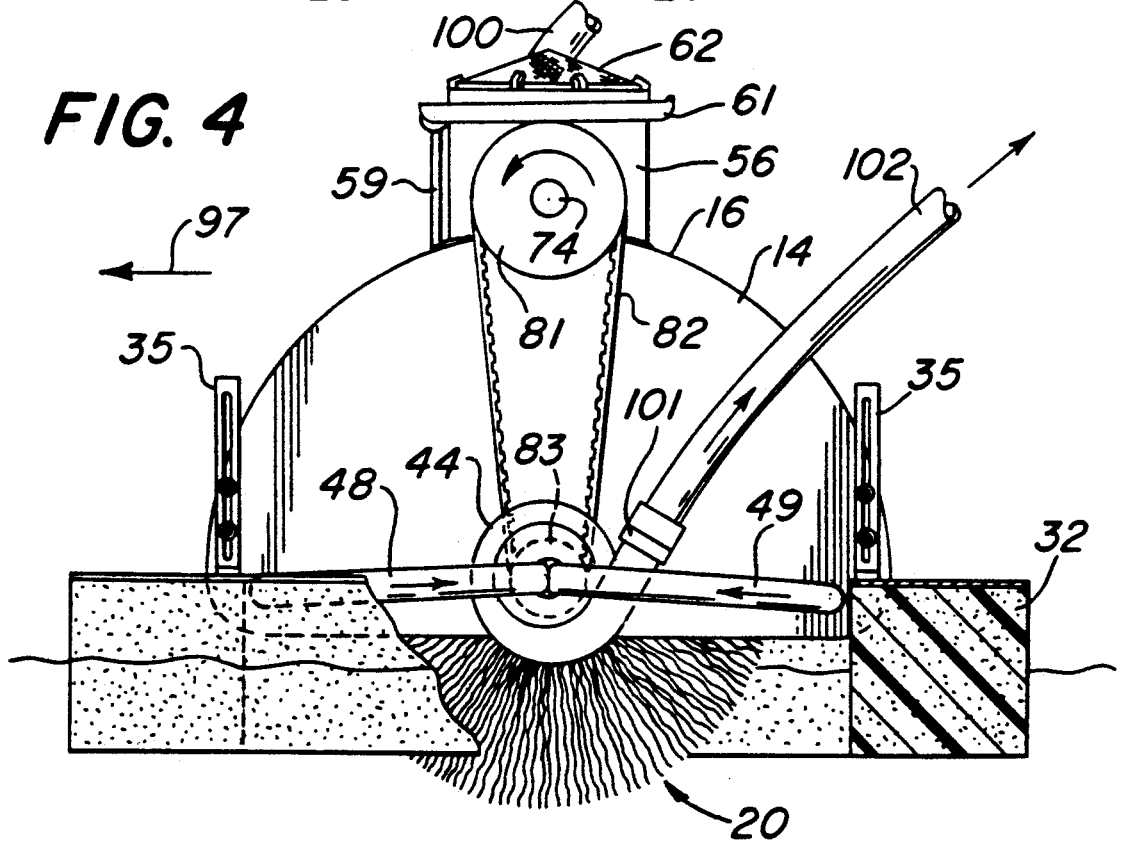
FIG. 4 is a right side view of FIG. 1 partially broken away for illustrative purposes.
Figure 5:
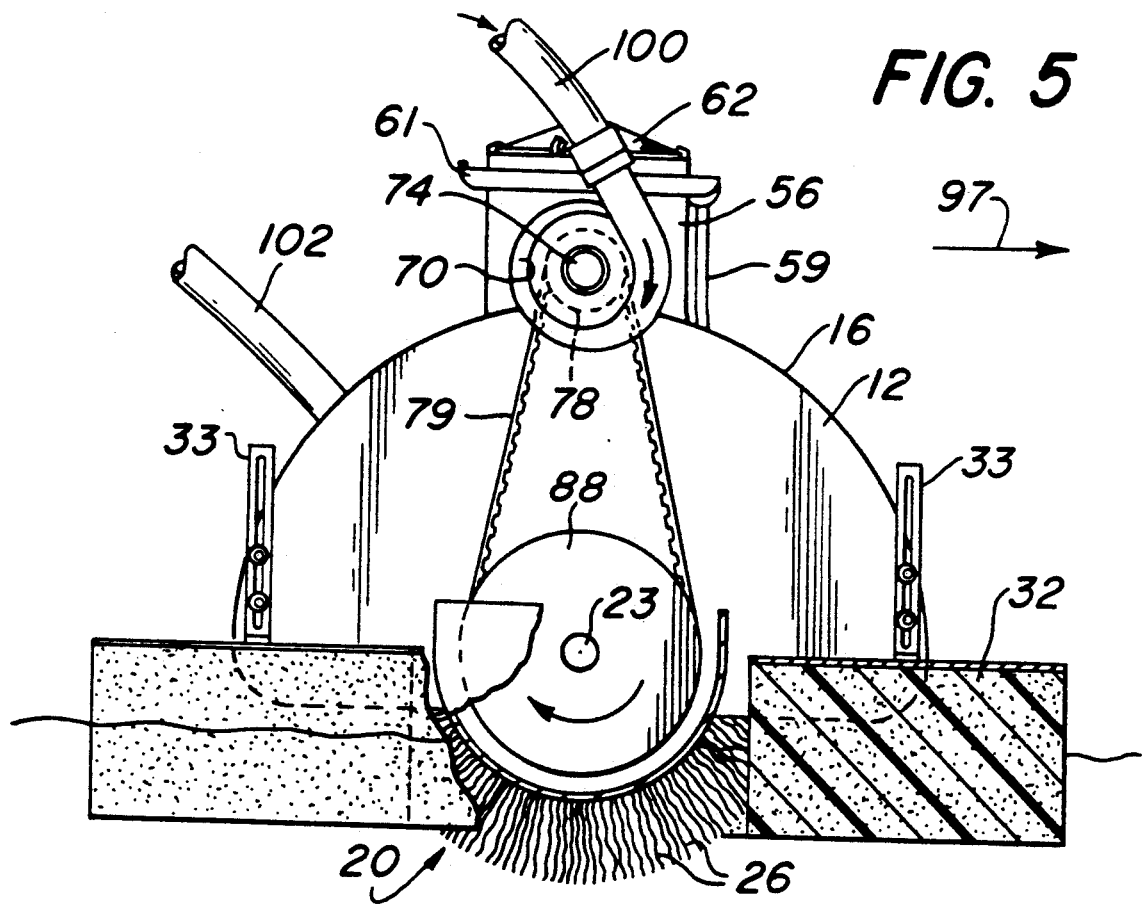
FIG. 5 is a left side view of FIG. 1 partially broken away for illustrative purposes.

By way of example, brush 20 may be 2-3 feet in diameter and 5-6 feet long. There is provided means for wiping oil from the surfaces of the bristles 26 as the brush 20 moves through said second portion of its rotation above the surface of the body of water to thereby separate the oil. Such means comprises a roller 40 made of a soft, tough urethane rubber and extending between and rotatably supported in sides 12 and 14 and located above the inner edge of portion 13, as best shown in FIG. 3. Roller 40 is arranged to function as a squeegee by compressing the bristles 26 of brush 20 and to roll therewith and squeeze the oil out of the compressed bristles 26 into the elongated catch pan provided by the trough configuration of portion 13. The trough portion 13 serves to collect the oil wiped off brush 20 in the catch pan construction thereof.

Referring to FIG. 3, as brush 20 rotates upwardly past trough portion 15 into housing chamber 18, the oil/water mixture on the bristles 26 picked up during the brush movement from portion 13 to portion 15 will be thrown outwardly by centrifugal action. Some of this mixture will come into contact with top wall 16 and fall into the catch pan provided by trough 15. Since the oil/water mixture collected in trough 15 remains in a relatively calm state, the water 19 in the mixture tends to accumulate in the bottom of portion 15 a shown in FIG. 3.

Means are provided for pumping the collected oil from portions 13 and 15 to a surface location. Such means comprises an oil pump 44 mounted on the right side 14 of the housing 10 by a suitable mounting 46, best shown in FIGS. 1 and 2. There is also provided a conduit means for delivering the collected oil from portions 13 and 15 to the suction of pump 44, such conduit means including a pair of pipes 48 and 49 having their upstream ends extending through openings in side 14 to communicate with the interior of portions 13 and 15, respectively, and their downstream ends connected to the suction of pump 44, as best shown in FIG. 1.

Figure 6:
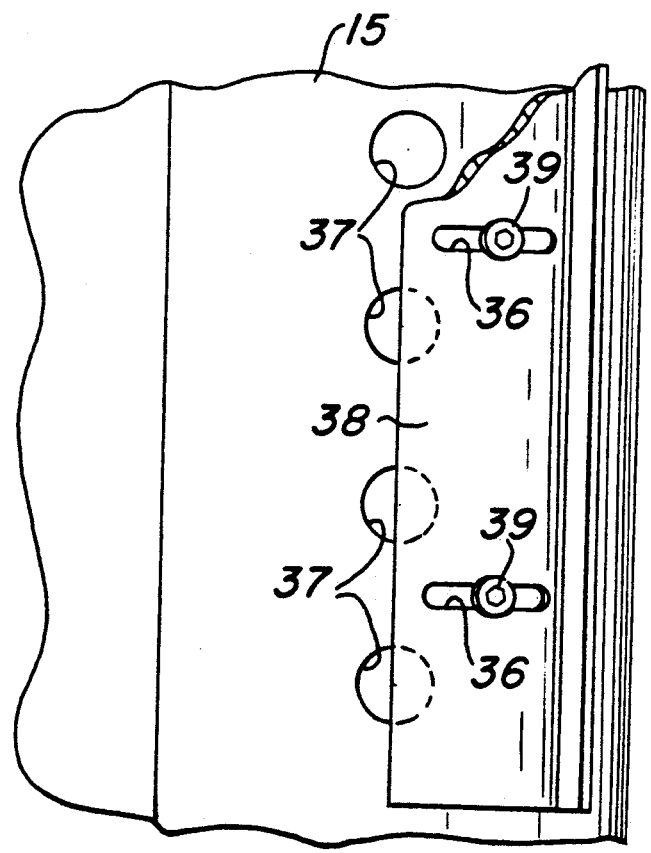
FIG. 6 is a sectional view taken on line 6—6 of FIG. 3.

As best shown in FIGS. 1, 3 and 6, the bottom of portion 15 is provided with a plurality of holes 37 extending along the length thereof in spaced apart relation. Holes 37 are provided to allow the water that collects in the bottom of portion 15 to run back into the sea therebeneath. This is possible because of the separating action that occurs in portion 15, wherein the liquid is in a calm state, by reason of the fact that the heavier water therein sinks to the bottom while the oil therein rises to the top thereof. The size of the open portions of holes 37 permitted to communicate with the outside of portion 15 is adjustable by means of a gate 38 that is adjustably mounted on portion 15 by means of a plurality of mounting bolts 39 which extend through slots 36 in gate 38 to threadedly engage portion 15. By this construction, gate 38 is adjustable to various positions extending across the holes 37 to vary the size of the openings therein for the flow of water from the bottom of portion 15.

There is provided a fan means mounted on housing 10 for creating a vacuum within the interior of chamber 18, such means comprising a small two-stage fan 50 comprising a pair of bladed rotors 52 and 54 that run in opposite directions to build up a substantial vacuum in chamber 18, such as about 20 to 30 inches of water vacuum. Fan rotors 52 and 54 are contained within a circular housing 56 defining a cylindrical fan chamber 58 extending vertically at the top central portion of wall 16. To this end, housing 56 is secured at the top central portion of wall 16 as is shown in the drawings to extend vertically. The fan means also comprises a pair of stainless steel skimmer screens 60 and 62 which function to separate out oil that is trapped in the air pumped by fan 50 so as to prevent said oil from escaping the system. To this end, primary screen 60 has a conical shape and is mounted at the bottom of housing 58 on the inlet side of the fan 50 and secondary screen 62 has a conical shape, is mounted at the top of housing 56 on the outlet or downstream side of the fan 50 and has a finer mesh than screen 60.

As shown by the flow arrows in FIG. 2, the operation of the fan 50 causes the air within chamber 18 to flow upwardly through screen 60, through the fan chamber 58 and through screen 62 to the exterior of the system. As this air flows through said flow path, the oil trapped therein will accummulate on and be separated out by the screens 60 and 62. The oil trapped on screen 60 will eventually fall, by gravity, back onto the bristles 26 of the rotating brush 20. The oil that is trapped on screen 62 will run to the bottom portion thereof by gravity and flow into an annular trough 61 formed at the top of housing 56. The oil collected in trough 61 will run to a low portion thereof from which it will be piped back into chamber 18 by the small downspout 59 (FIG. 3).

It will be apparent that in use housing 10 is supported by floats 32 and 34 so that the bottom portions 13 and 15 are spaced apart from the surface of the water, as shown in FIG. 3, to define air flow passages beneath the portions 13 and 15 whereat high velocity air rushes therepast, and through bristles 26 on the way to the interior of chamber 18. What occurs in the use of the device is that as the wave action of the water moves the surface of the water toward and away from the bottom of portions 13 and 15, said air flow passages open and close whereby air rushes past the portions 13 and 15 and entrains with it an oil/water mixture composed mostly of oil which is concentrated on the surface of the water to thereby provide a spray-like flow of air and entrained oil directed into the bristles 26 of brush 20 on either side thereof as viewed in FIG. 3. This spray-like flow of air containing the entrained oil/water mixture brings said mixture in a spray-like manner against the brush bristles 26 whereat the more adherent oil tends to be accumulated on the radially inward portions thereof as the brush 20 rotates. This collected and entrapped oil is then removed from the brush 20 in the manner as described above.

Means are provided for driving the oil separating mechanisms including brush 20, oil pump 44 and fan 50. Such means comprises a water driven turbine 70 mounted on housing 10 by a mounting means 72 shown in FIGS. 1 and 2 and constructed and arranged to cause rotation of a main drive shaft 74. By way of example, the water driven turbine 70 is a 25 horsepower, radial reaction turbine such as the "TYPHOON" turbine manufactured by Hale Fire Pump Company. Briefly, the turbine 70 comprises a runner mounted and keyed to the turbine output shaft to rotate within the interior of the turbine housing which comprises a volute body and a head and is provided with an inlet 71 and an outlet 73 for directing water into and out of the turbine housing. The turbine output shaft is rotatably supported by bearing means contained in the head of the turbine housing. The turbine output shaft is coupled to the main drive shaft 74 which is supported on bearings 74 and 76 contained in bearing pedestals 75A and 76A mounted on the top wall 16 whereby shaft 74 extends across the top portion of housing 10 as shown in FIGS. 1 and 2.

Means are provided for driving the shaft 23 of brush 20 from the main drive shaft 74. Such means comprises a belt driven speed reducer arrangement including a drive pulley 78 keyed on the main drive shaft 74 and arranged to drive a driven pulley 80 keyed on the end of brush shaft 23 by means of a cog belt 79. Driven pulley 80 is larger than the drive pulley 78 whereby the brush shaft 23 will be driven at a much slower RPM than the main drive shaft 74 Typically, the main drive shaft 74 will be driven by the water turbine at about 2000 RPM and the speed is reduced so that the brush rotates at about 600–700 RPM.

Means are provided for driving the oil pump 44 from the main drive shaft 74, such means comprising a belt drive constructed and arranged to operate as a speed increaser for driving the pump 44 at a higher speed than the main drive shaft 74. Such means comprises a large drive pulley 81 mounted on the end of the main drive shaft 74 and arranged to drive, by means of a cog belt 82, a driven pulley 83 mounted on the drive shaft 43 of pump 44, as is best shown in FIG. 2. Typically, the parts are constructed and arranged so that the speed increaser causes the oil pump to rotate at about 3,000–4,000 RPM.

Means are provided for driving the two fan rotors 52 and 54 of fan 50 from the main drive shaft 74, such means comprising a stepped up beveled gear arrangement as best shown in FIG. 2. The beveled gear arrangement comprises a large input beveled gear 86 keyed onto the main drive shaft 74 and arranged to drive a pair of small beveled gears 88 and 90 which are keyed onto the drive shafts for the two fan rotors 52 and 54, respectively. The arrangement serves as a speed increaser s that the fan 50 operates at the high speed necessary to achieve the air flow operation described above, said speed being 2-3 times the turbine speed.

The high pressure water supply for the water driven turbine 70 may take various forms depending on the location where the oil skimmer and separator device of the invention will be used. As shown in the Drawings, a fire pump 99 on a ship 98, such as one that supplies 250 gallons per minute at 150 psi, is arranged to supply water to a 2½ inch fire hose 100. The suction of the fire pump 99 is arranged to draw sea water through an inlet hose which extends therefrom into the water beneath the ship. The supply hose 100 has its discharge end connected to the inlet 71 of the turbine 70 for supplying high pressure water thereto for driving the same.

The means for receiving the separated oil delivered from the oil pump 44 through the discharge 101 thereof may take various forms depending where the location of the device is used. As shown in FIGS. 1 and 2, the oil receiving means comprises a tank 104 which may be an expandable type located on board the ship, and which has the oil from pump 44 delivered thereto by hose 102. It will be apparent that the discharge from the oil pump 44 could also be directed into an empty tank or into another type of tank, such as a plastic or rubberized, re-inforced bag for hauling off for further processing at shore.

As stated above, the oil separator and skimmer device of the invention lends itself to emergency situations where it is necessary to quickly deploy the device for operation without necessarily taking the time to get heavy equipment on the scene. To this end, the device is made of light weight components including the light weight water-driven turbine 70. Also, the housing 10 is made of light weight material, as are the other parts of the device.

In use, the device of the invention may be used in conjunction with means for directing the oil/water mixture from the surface of the body of water into the mouth at the forward end of the device located between the floats 32 and 34. Such means is described in detail in my copending application Ser. No. 558,693 and, briefly stated, comprises a pair of elongated members extending from the skimmer device in a diverging relation to one another. The elongated members are made of a material such that they float in the water with a portion thereof extending above the water level and are restrained by nylon ropes at their extended portion. As the skimmer device is pushed across the water (in the direction of arrow 97 in FIG. 3), the elongated members provide a wide swath which serves to skim the oil on the surface of the body of water and direct and concentrate this surface oil in the region of the skimmer means.

What is claimed is:

1. An oil separator for use in cleaning up oil spills from a body of water containing the same comprising:
    means providing a housing having an opening overlying the body of water containing the oil spill,
    a brush rotatably mounted in said housing to extend through said opening therein and for movement through a circular path including a first portion wherein said brush dips into and moves through the oil/water mixture near the surface of said body of water to pick up oil adhering to the brush surfaces and a second portion located above the surface of said body of water,
    means for driving said brush,
    means for wiping oil from said brush surfaces thereof as said brush moves through said second portion of said circular path to thereby separate the oil,
    means for collecting the wiped off oil in a container,
    means for pumping the collected oil from said container thereof to a surface location, said oil pumping means including a pump and means for driving said pump,
    said brush driving means and said pump driving means including a water driven turbine constructed and arranged to cause rotation of said brush and operation of said pump,
    said water driven turbine including a housing and a bladed impeller mounted for rotation within said housing, said housing having an inlet and an outlet for directing water into and out of said housing for driving said impeller,
    float means constructed and arranged to support the oil separator near the surface of the body of water containing the oil spill so that said brush is positioned to move through said circular path,
    a main pump having a suction and a discharge and lines for connecting the discharge of said main pump to the inlet of said water driven turbine for driving the same, and
    means for supplying water to the suction of said main pump from the body of water containing the oil spill.

2. An oil separator according to claim 1 including main pump means for pumping water under pressure to drive said water turbine, said main pump means being located at a remote location from the oil separator and connected to said water turbine by hose lines.

3. An oil separator according to claim 1 wherein said means for pumping collected oil to the surface location comprises a hose extending from the discharge of said oil pump to said surface location for delivering the separated oil to a receiving means therefor.

4. An oil separator according to claim 1 wherein said means for driving said brush is constructed and arranged to include a speed reducer.

5. An oil separator according to claim 1 wherein said means for driving said pump includes a speed increaser for increasing the RPM of the pump drive shaft relative to the RPM of the output shaft of said water driven turbine.

6. An oil separator according to claim 1 including means mounting said brush for adjustment toward and away from the body of water containing the oil spill.

7. An oil separator according to claim 1 including means for delivering the water discharged from said outlet of said housing of said water driven turbine back into the body of water containing the oil spill.

8. An oil separator for use in cleaning up oil spills from a body of water containing the same comprising:
   means providing a housing having an opening overlying the body of water containing the oil spill,
   a brush rotatably mounted in said housing to extend through said opening therein and for movement through a circular path including a first portion wherein said brush dips into and moves through the oil/water mixture near the surface of said body of water to pick up oil adhering to the brush surfaces and a second portion located above the surface of said body of water,
   means for driving said brush,
   means for wiping oil from said brush surfaces thereof as said brush moves through said second portion of said circular path to thereby separate the oil,
   means for collecting the wiped off oil in a container,
   means for pumping the collected oil from said container thereof to a surface location, said oil pumping means including a pump and means for driving said pump,
   said brush driving means and said pump driving means including a water driven turbine constructed and arranged to cause rotation of said brush and operation of said pump,
   float means constructed and arranged to support the oil separator near the surface of the body of the water containing the oil spill so that said brush is positioned to move through said circular path, and
   a fan mounted in said housing for creating a vacuum in the interior of said housing.

9. An oil separator according to claim 8 wherein said housing is constructed and arranged to define inlet openings spaced from the surface of said body of water to define a passage whereby high velocity air rushes therepast into the interior of said housing.

10. An oil separator according to claim 9 including a plurality of skimmer screens, one of said screens being mounted on the downstream end of said fan for trapping oil contained in the fluid driven by said fan, the other of said screens being mounted on the inlet side of said fan.

11. An oil separator according to claim 8 including means for driving said fan from said water driven turbine.

12. An oil separator for use in cleaning up oil spills from a body of water containing the same comprising:
   means providing a housing having an opening overlying the body of water containing the oil spill,
   a brush rotatably mounted in said housing to extend through said opening therein and for movement through a circular path including a first position wherein said brush dips into and moves through the oil/water mixture near the surface of said body of water to pick up oil adhering to the brush surfaces and a second portion located above the surface of said body of water,
   means for driving said brush,
   means for wiping oil from said brush surfaces thereof as said brush moves through said second portion of said circular path to thereby separate the oil,
   means for collecting the wiped off oil in a container,
   means for pumping the collected oil from said container thereof to a surface location, said oil pumping means including a pump and means for driving said pump,
   said brush driving means and said pump driving means including a water driven turbine constructed and arranged to cause rotation of said brush and operation of said pump,
   said water driven turbine including a housing and a bladed impeller mounted for rotation within said housing, said housing having an inlet and an outlet for directing water into and out of said housing for driving said impeller,
   float means constructed and arranged to support the oil separator near the surface of the body of water containing the oil spill so that said brush is positioned to move through said circular path,
   a main pump having a suction and a discharge and lines for connecting the discharge of said main pump to the inlet of said water driven turbine for driving the same,
   means for supplying water to the suction of said main pump from a water supply, and
   means for delivering water from the outlet of said housing of said water driven turbine into said body of water containing the oil spill.

* * * * *